May 12, 1942.  A. ARUTUNOFF  2,283,117
ELECTRIC CABLE FOR DEEP WELL PUMPS
Filed Jan. 22, 1938
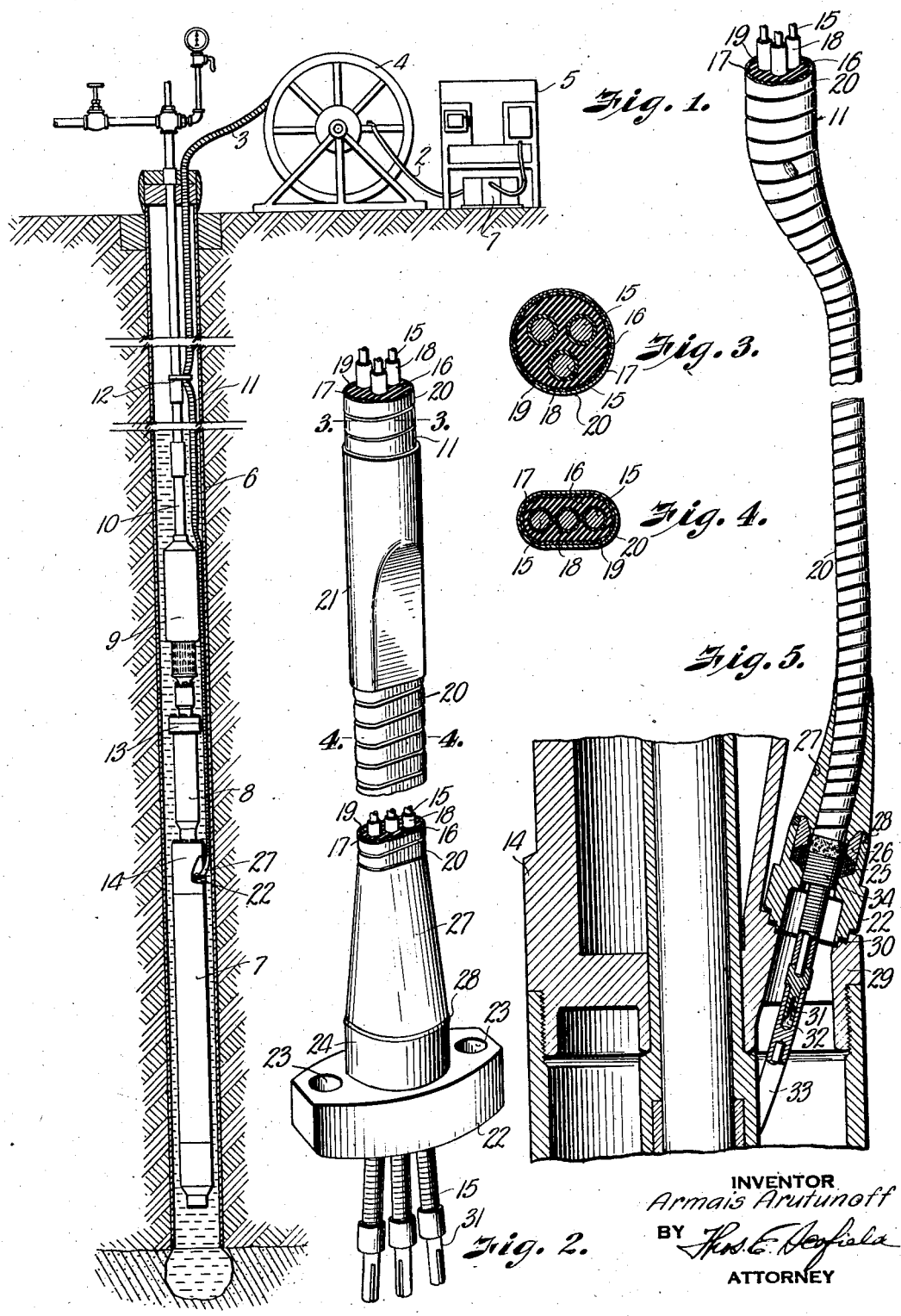
INVENTOR
Armais Arutunoff
BY
ATTORNEY Patented May 12, 1942

2,283,117

UNITED STATES PATENT OFFICE 2,283,117

ELECTRIC CABLE FOR DEEP WELL PUMPS

Armais Arutunoff, Bartlesville, Okla., assignor to Reda Pump Company, Bartlesville, Okla., a corporation of Delaware Application January 22, 1938, Serial No. 186,391

2 Claims. (Cl. 103—87)

My invention relates to electric cables, and more particularly to electric cables adapted to conduct power to submerged deep well motors for operating deep well pumps, and means for connecting the cable terminal to the pump.

A deep well pump comprises an elongated pump housing containing a plurality of pumping stages adapted to lift oil through a distance frequently in excess of a mile in height. The motor for driving the pump for lifting a column of oil through this distance must be supplied with power, and this is done through a cable running alongside of the eduction tubing and connecting with the winding of the motor. It will be understood by those skilled in the art that the casing diameter of a deep well pump is necessarily limited, rarely being in excess of eight inches in diameter.

Due to the limitations in the diameter of the casing in which the pump and motor must rest, it is imperative that the maximum cross sectional space be made available for the pump and motor construction. Cables of standard construction cannot be used as they are commonly of cylindrical cross sectional shape and occupy too large a portion of the area available. It is imperative further that the cable at the point of connection with the motor housing be sealed against the hydrostatic pressure existing in the well, as seepage of oil, frequently containing moisture, will interfere with the operation of the motor.

One object of my invention is to provide a novel cable construction adapted to furnish power to submerged motors for driving deep well pumps.

Another object of my invention is to provide a novel cable construction which is rugged and reliable in use, and economical to manufacture.

A further object of my invention is to provide a novel cable construction having lengths of different cross sectional configuration.

A further object of my invention is to provide a novel electric cable having sections of different cross sectional configuration provided with continuous insulation common to both sections.

A still further object of my invention is to provide a novel means for connecting the terminal of the cable to the motor housing, in liquid tight relation.

Other and further objects of my invention will appear from the following description.

In the accompanying drawing which forms part of the instant specification and is to be read in conjunction therewith and in which like reference numerals are used to indicate like parts in the various views:

Fig. 1 is a diagrammatic view of a cross section of a well provided with a deep well pump fitted with a cable assembly embodying my invention.

Fig. 2 is an enlarged perspective view with parts broken away showing the novel portion of my cable assembly and cable terminal adapted to be connected to the motor housing.

Fig. 3 is a sectional view taken on the line 3—3, Fig. 2.

Fig. 4 is a sectional view taken on the line 4—4, Fig. 2.

Fig. 5 is a sectional view of the upper portion of the motor housing showing the cable connecting construction.

Referring now to the drawing, power for driving the motor may be obtained from any suitable source, as for example, a motor generator 1, the output of which is led by cable 2 to cable 3 which is normally housed upon a reel 4. A control panel 5 is provided with the usual ammeters, circuit breakers, switches and the like. Within the oil well casing 6, adjacent the bottom thereof is positioned a deep well pump assembly comprising an electric motor 7, a protector 8 and a pump unit 9, adapted to pump oil from the well through eduction tubing 10. Above the pump, there is sufficient room within the casing in the annular space between the eduction tubing 10 and the casing 6 to employ cable 11 of conventional cylindrical cross sectional shape. Due to the fact, however, that the available space within the casing must in great part be taken up by the pump, there is insufficient room to use a cable of conventional cylindrical cross sectional shape.

If the size of the pump be reduced to such point to enable the utilization of the cable of conventional cylindrical cross sectional shape, then the pump must be made correspondingly longer in order to get the capacity necessary to do the work required of it.

A short distance above the end of the cable 11 of conventional cross sectional shape, I may provide clamp 12 to clamp the cable to the tubing.

The conducting cable 11 is made in accordance with my Letters Patent No. 1,952,191, bearing date March 27, 1934, and comprises conductors 15 with the inter-conductor space completely filled with rubber or rubber compound 16. This rubber prevents the migration of fluid along the cable should the armor 17 leak at any place along the cable.

Cable of circular cross sectional area is usually more efficient and may be purchased more economically, so that it is desirable to use cable of this nature where possible. The clearance space between the outer shell of the motor protector and pump is such that, in accordance with my invention, I make the cable flat in this vicinity in order to enable maximum cross sectional area to be available for use for motor and pump assembly. The cable proper, as can readily be seen by reference to Fig. 3, comprises a plurality of conductors 15 symmetrically disposed about the center line of the cable. The conductors may be solid copper or other suitable conducting material, or may be of the multi-strand type. A layer of rubber 18 encloses each conductor. Surrounding the insulating material 16 may be one or more layers of insulating tape 19. This insulating tape may be of any suitable type such as varnished cambric impregnated with oil-proof lacquer. The entire assembly is enclosed in an armored sheath 20 formed by a spiral interlocking galvanized steel strip.

The flattened portion of the cable is shown in detail in Fig. 4, and is made similarly to that shown in Fig. 3 except that the cables are aligned, resulting in a cable of flattened cross sectional shape. The round portion of the cable and the flattened portion of the cable are spliced by unwinding the armor strip for a short distance back along each cable portion, splicing the conductors in a manner well known to the art as by soldering, and then vulcanizing the end of the round cable portion insulation, thus forming a continuous, integral insulating jacket, preventing the migration of fluids along the interstices which would otherwise be formed.

A suitable metal sheath 21 may replace the armor at the joint. This sheath not only secures the armor 20 in place, but reinforces the junction between the flat cable and the round cable. In order to insure complete flexibility inside of the sheath 21, I may wind the armor 20 around the junction and secure the ends thereof by solder as will readily be seen by reference to Figure 5. In this manner a continuous cable having one portion cylindrical in cross section, and the other portion flattened in cross section is formed.

The lower end of the cable terminates in a flange 22 provided with bolt holes 23. A body portion 24 is provided with a stuffing box into which the lower end of the cable passes. Within the stuffing box packing 25 is compressed by a gland 26. The gland is compressed by a special fixture and held in its compressed position by solder 28, after which the compressing fixture is removed. By this arrangement, a reliable compression of the packing is achieved without use of customary tightening means, such as flanges with bolts. It will be obvious that, due to the flattened cross sectional shape of the cable being sealed, that the usual threaded gland cannot be employed. The end of the cable which is housed in the stuffing box is wrapped with asbestos or cotton fabric 34. This has been saturated with insulating varnish and is wrapped around the end of the cable to insure a sealing surface against which the packing material 25 may seal, and at the same time prevents the end of the armor from unwinding.

A tapered sheath 27 is secured by the annular ring of solder 28 to the upper end of the body portion 24. The flange 22 is bolted by stud bolts or the like to a portion 29 of the motor housing, the joint being made liquid tight by a confined gasket 30. The conductors 15 terminate in split contacting pins 31 adapted to seat in sockets 32, formed in the ends of the conductors 33 leading to the motor winding. These contacting pins 31 are made of the same outside diameter as the inside diameter of the sockets 32. This construction together with the split ends insures a very tight fit after the pins are forced into place.

It will be observed that I have accomplished the objects of my invention. I have provided a novel cable construction adapted to furnish power to submerged motors for driving deep well pumps, which is rugged and reliable in use, and economical to manufacture. I have provided a novel cable construction having lengths of different cross sectional configuration, with continuous insulation common to both sections. I have provided an efficient and novel means for connecting the terminal of a cable to a motor housing in fluid tight relationship, the cable construction being such that it will occupy the minimum cross sectional space within an oil well casing.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a submergible deep well pump motor assembly adapted to be lowered into an oil well casing, an electric motor for driving the deep well pump, an electric cable for conducting electric energy to said electric motor, said cable comprising a section of circular cross sectional shape to a point just above the pump motor assembly, and a flat cable connected with said cable of circular cross sectional shape extending past the pump assembly through spaces of relatively small clearance.

2. An assembly for pumping liquids from deep wells, including in combination a submergible electric motor driven pump suspended at the end of a discharge pipe within a small diameter deep well casing, a flexible power conducting cable comprising an upper portion of circular cross sectional shape, and a lower portion of flattened cross sectional shape, said flattened cable portion extending adjacent the pump through spaces of small clearance.

ARMAIS ARUTUNOFF.